US012580442B2

(12) United States Patent
Mizukami et al.

(10) Patent No.: US 12,580,442 B2
(45) Date of Patent: Mar. 17, 2026

(54) MOTOR

(71) Applicant: Nidec Corporation, Kyoto (JP)

(72) Inventors: Junya Mizukami, Kyoto (JP); Shinya Kuramoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 218 days.

(21) Appl. No.: 18/369,288

(22) Filed: Sep. 18, 2023

(65) Prior Publication Data

US 2024/0106298 A1 Mar. 28, 2024

(30) Foreign Application Priority Data

Sep. 22, 2022 (JP) ................................. 2022-151904

(51) Int. Cl.
| | |
|---|---|
| *H02K 5/173* | (2006.01) |
| *F16C 19/08* | (2006.01) |
| *H02K 7/08* | (2006.01) |
| *H02K 21/22* | (2006.01) |

(52) U.S. Cl.
CPC ........... *H02K 5/1735* (2013.01); *F16C 19/08* (2013.01); *H02K 7/085* (2013.01); *H02K 21/22* (2013.01); *F16C 2380/26* (2013.01)

(58) Field of Classification Search
CPC ........... H02K 5/00; H02K 5/16; H02K 5/163; H02K 5/17; H02K 5/173; H02K 5/1735; H02K 7/00; H02K 7/08; H02K 7/085; H02K 21/00; H02K 21/22; F16C 19/00;

F16C 19/08; F16C 19/54; F16C 25/00; F16C 25/06; F16C 35/00; F16C 35/06; F16C 35/067; F16C 35/07; F16C 35/077
See application file for complete search history.

(56) References Cited

U.S. PATENT DOCUMENTS

2011/0006634 A1* 1/2011 Nomura ............... H02K 5/1735
310/216.113

FOREIGN PATENT DOCUMENTS

| | | | | |
|---|---|---|---|---|
| JP | 2022-095017 A | 6/2022 | | |
| WO | WO2017183473 A1 * | 10/2017 | ............. | H02K 5/173 |
| WO | WO2021200475 A1 * | 10/2021 | ............... | H02K 5/16 |

* cited by examiner

*Primary Examiner* — Tran N Nguyen
(74) *Attorney, Agent, or Firm* — Keating & Bennett, LLP

(57) ABSTRACT

A motor includes a holder, a rotor inside the holder with a shaft rotatable about a central axis, first and second bearings rotatably supporting the shaft, and a stator radially outside the holder. The holder includes a first holder, and a second holder extending upward from an upper end of the first holder. The stator is fixed to an outer peripheral surface of the first holder, and an outer ring of the first bearing is fixed to a lower end of an inner peripheral surface of the first holder. A portion of an outer ring of the second bearing is fixed to an inner peripheral surface of the second holder. The second holder is radially spaced from the stator core. A radial thickness of the second holder is less than a distance between an outer peripheral surface of the second holder and an inner peripheral surface of the stator core.

6 Claims, 5 Drawing Sheets

F i g. 1
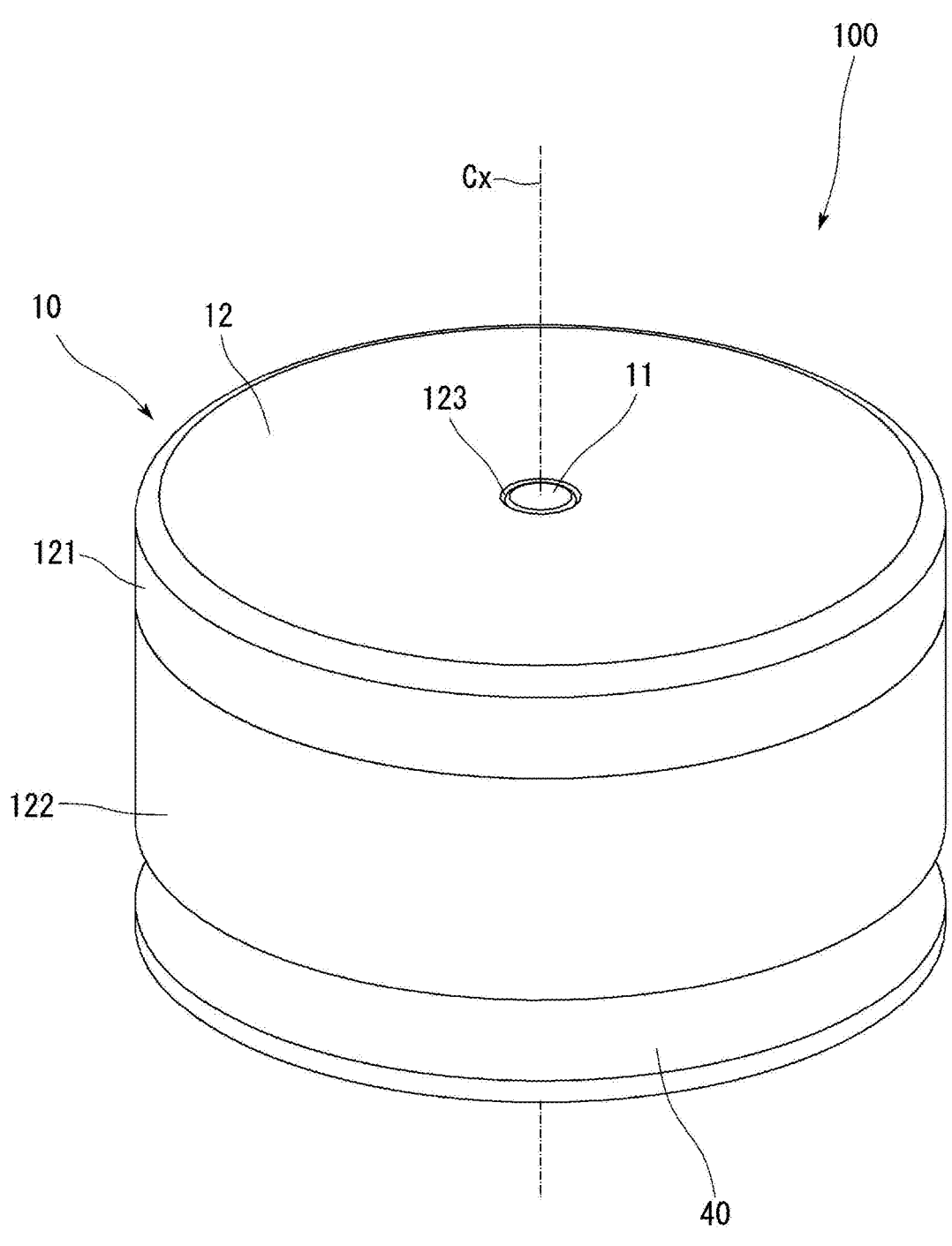

F i g . 4
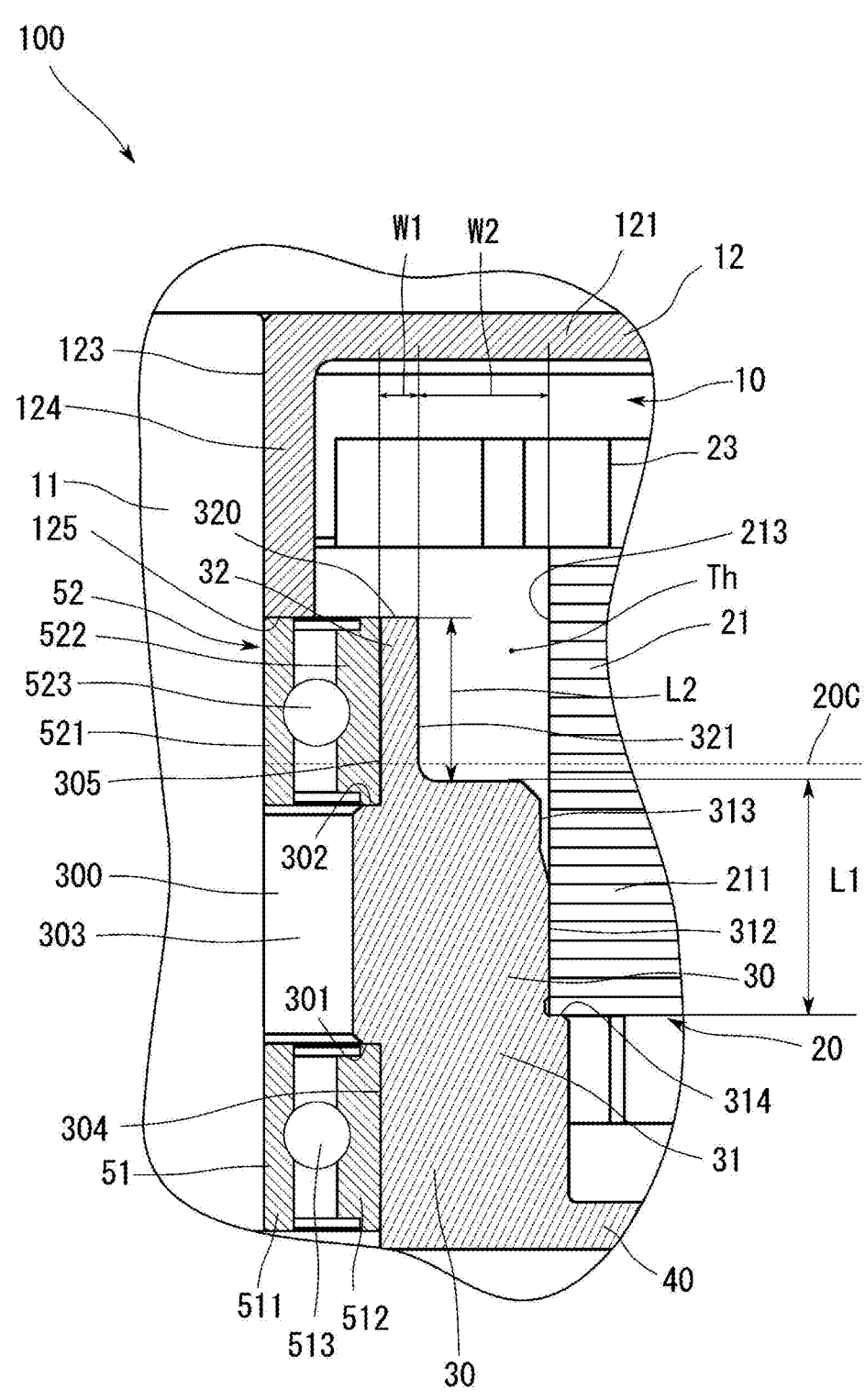

MOTOR

CROSS-REFERENCE TO RELATED APPLICATIONS

The present application claims priority under 35 U.S.C. § 119 to Japanese Patent Application No. 2022-151904, filed on Sep. 22, 2022, the entire contents of which are hereby incorporated herein by reference.

1. FIELD OF THE INVENTION

The present disclosure relates to a motor.

2. BACKGROUND

In a conventional motor, a shaft is rotatably supported via a bearing fixed to a bearing housing press-fitted into a base plate. A stator core is fixed to the outer peripheral surface of the bearing housing.

However, in the motor described above, since a portion of the bearing housing supporting the bearing is in contact with the stator core, the heat of the stator core is easily transferred to the bearing. Therefore, the temperature of the bearing is increased by the heat from the stator core, and the life of the bearing is reduced, so that the operation of the bearing may be difficult to stably rotate for a long period of time.

SUMMARY

A motor according to an example embodiment of the present disclosure includes a rotor including a shaft and a rotor magnet rotatable about a central axis extending vertically, a stator including a stator core and radially opposed to a radially inner side of the rotor magnet, a bearing portion that rotatably supports the shaft, and a holding portion that has a cylindrical shape centered on the central axis and holds the bearing portion. The bearing portion includes a first bearing and a second bearing located above the first bearing. The holding portion includes a cylindrical first holding portion extending along the central axis, and a cylindrical second holding portion extending upward along the central axis from an upper end portion of the first holding portion. The stator core is fixed to an outer peripheral surface of the first holding portion, an outer ring of the first bearing is fixed to a lower end portion of an inner peripheral surface of the first holding portion, at least a portion of an outer ring of the second bearing is fixed to an inner peripheral surface of the second holding portion, a gap is located between the second holding portion and the stator core in a radial direction, and a radial thickness of the second holding portion is smaller than a radial distance between an outer peripheral surface of the second holding portion and an inner peripheral surface of the stator core.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a perspective view of a motor according to a preferred embodiment of the present application.

FIG. 4 is an enlarged cross-sectional view of a holding portion and a bearing portion of the motor.

DETAILED DESCRIPTION

Hereinafter, example embodiments of the present disclosure will be described in detail with reference to the drawings. In the present specification, a direction parallel to the center axis Cx of a motor 100 is referred to by the term "axial direction", a direction perpendicular to the center axis Cx is referred to by the term "radial direction", and a direction along an arc about the center axis Cx is referred to by the term "circumferential direction".

In addition, in the present specification, in the motor 100, the axial direction is defined as a vertical direction, but the vertical direction is a name used merely for description, and a positional relationship and a direction in an actual use state of the motor 100 are not limited. Furthermore, in the present specification, "parallel" includes not only a case of being exactly parallel, but also a case of being arranged side by side without intersecting within a practical range.

Figure 2:
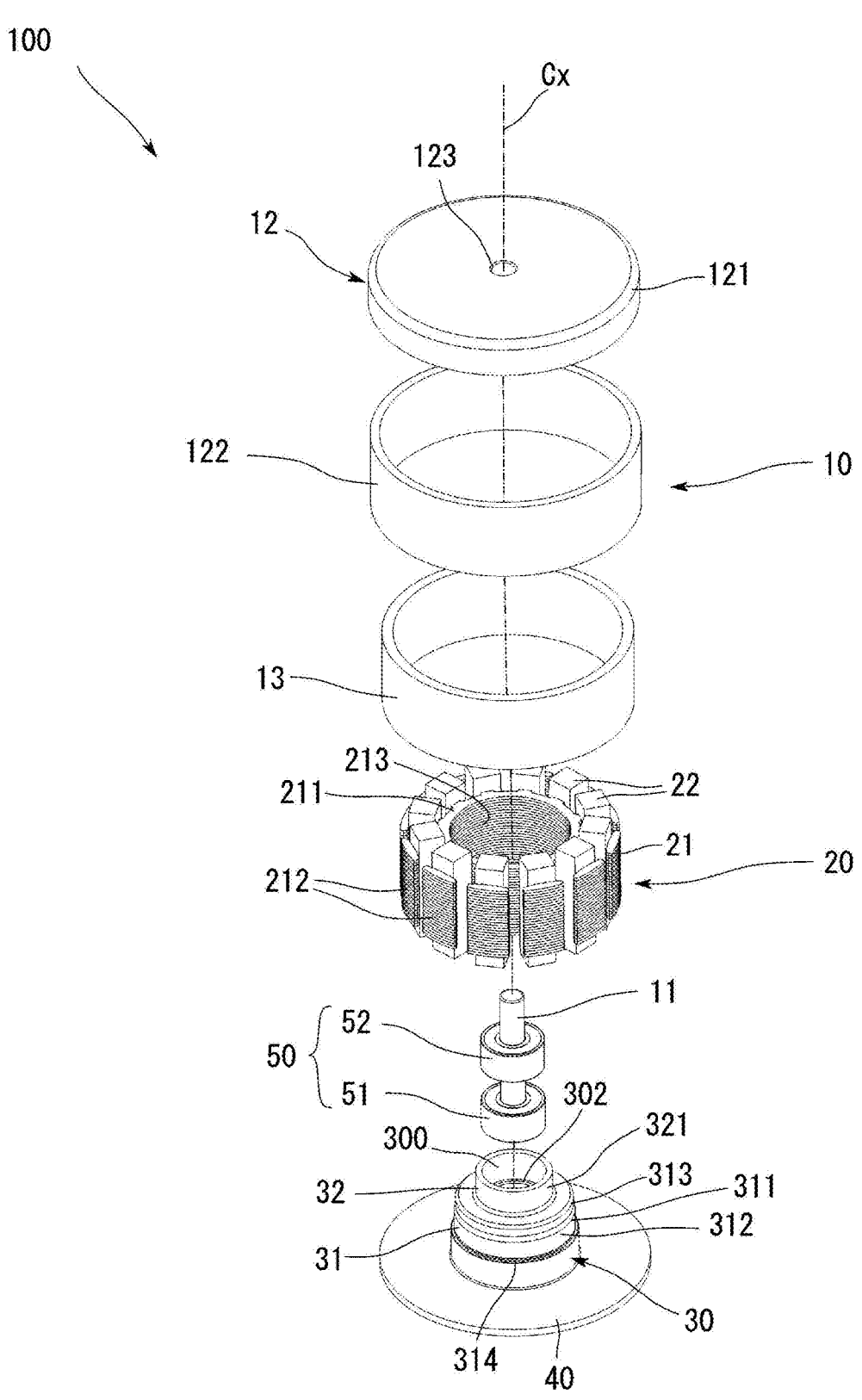
FIG. 2 is an exploded perspective view of the motor.
Figure 3:
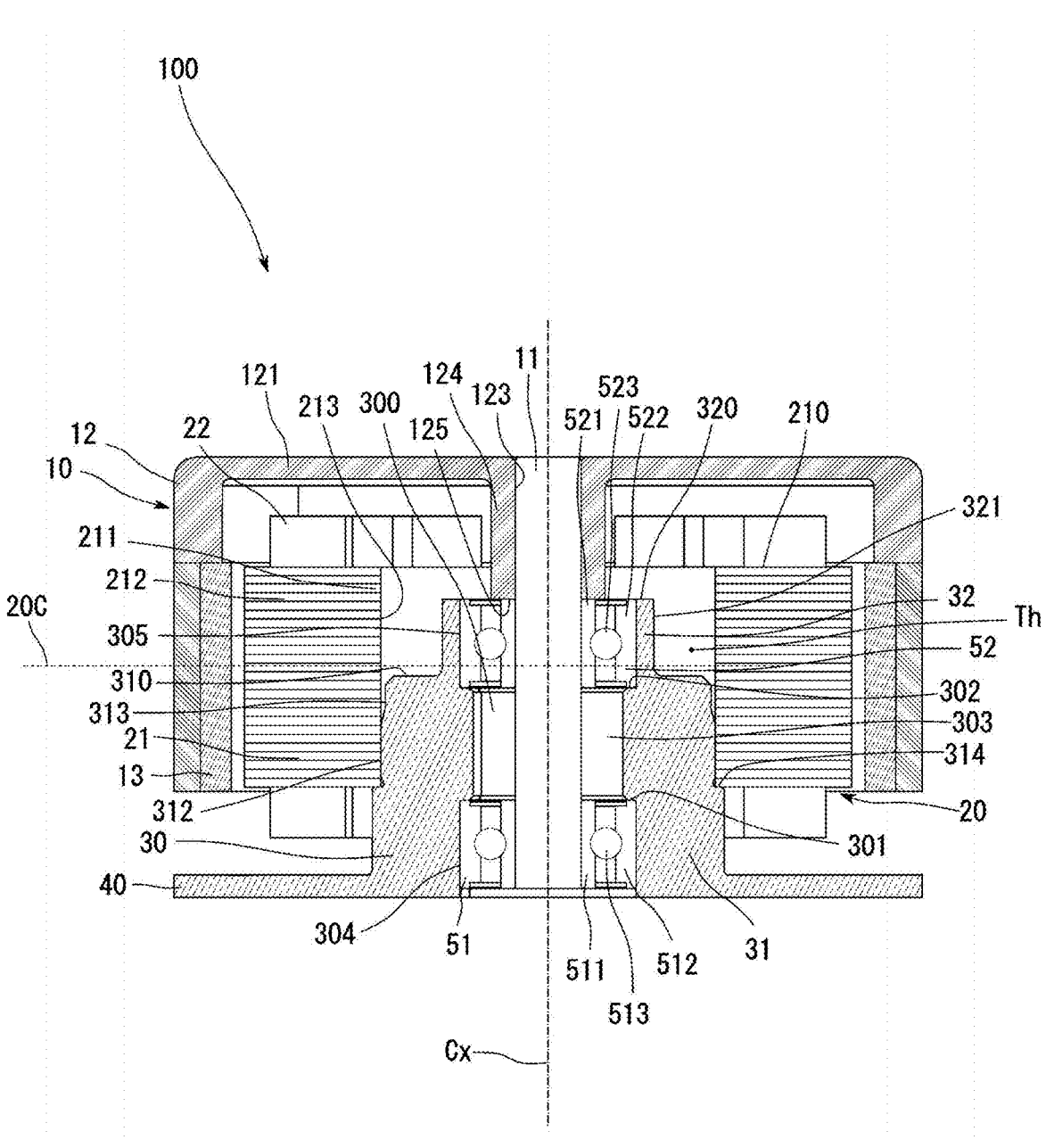
FIG. 3 is a vertical cross-sectional view of the motor.

FIG. 1 is a perspective view of the motor 100. FIG. 2 is an exploded perspective view of the motor 100. FIG. 3 is a vertical cross-sectional view of the motor 100. FIG. 4 is an enlarged cross-sectional view of a holding portion 30 and a bearing portion 50 of the motor 100. As illustrated in FIG. 1, the motor 100 includes a rotor 10, a stator 20, a holding portion 30, and a bearing portion 50. The motor 100 is a so-called outer rotor type brushless DC motor, and a rotor magnet 13 described later of the rotor 10 is disposed radially outside the stator 20. The rotor magnet 13 of the rotor 10 faces the radially outer surface of the stator 20 in the radial direction.

The rotor 10 rotates about the central axis Cx. As illustrated in FIGS. 1 and 2, the rotor 10 includes a shaft 11, a rotor case 12, and a rotor magnet 13.

The shaft 11 has a columnar shape centered on the central axis Cx. A part of the shaft 11 is disposed inside the holding portion 30. The shaft 11 rotates about the central axis Cx. An upper portion of the shaft 11 is disposed above the upper end of the holding portion 30. Details of the holding portion 30 will be described later.

The rotor case 12 has a covered cylindrical shape formed of a magnetic material, and includes a rotor hub 121 and a cylindrical portion 122. The rotor hub 121 is fixed to the shaft 11. That is, the rotor 10 includes the rotor hub 121 fixed to the shaft 11. The rotor hub 121 has an annular shape having a through hole 123 penetrating in the axial direction at the center. That is, the rotor hub 121 has the through hole 123 which is disposed at the center when viewed from the axial direction and in which the shaft 11 is disposed.

The rotor hub 121 has a cylindrical rotor boss 124 extending axially downward from a peripheral portion of the through hole 123. The shaft 11 is fixed to the rotor boss 124. In other words, the shaft 11 and the rotor case 12 are fixed by the rotor boss 124. Here, the rotor boss 124 and the shaft 11 are fixed by press fitting, but the present disclosure is not limited thereto. As the fixing method, for example, a method capable of firmly fixing the rotor boss 124 to the shaft 11, such as adhesion, deposition, and screwing, can be widely adopted.

The cylindrical portion 122 has a cylindrical shape and extends in the axial direction from the radially outer edge of the rotor hub 121. The rotor magnet 13 is fixed to the inner peripheral surface of the cylindrical portion 122.

The rotor magnet 13 has a cylindrical shape. In at least the inner peripheral surface of the rotor magnet 13, N poles and S poles are alternately arranged in the circumferential direction. In the present example embodiment, the rotor magnet 13 has a cylindrical shape, but is not limited thereto. For example, a plurality of flat plate magnets may be arranged and fixed on a cylindrical rotor core in the circumferential direction.

That is, the rotor 10 includes the shaft 11 and the rotor magnet 13 that rotate about the central axis Cx extending vertically.

The stator 20 is disposed radially inside the rotor magnet 13 and radially faces the rotor magnet 13. The stator 20 includes a stator core 21, an insulator (not illustrated), and a coil 22. That is, the stator 20 includes the stator core 21 and opposes the radially inner side of the rotor magnet 13 in the radial direction. The stator core 21 is a laminated body in which electromagnetic steel sheets are laminated in the axial direction. Note that the stator core 21 is not limited to the laminated body in which the electromagnetic steel sheets are laminated, and may be a single member, such as a fired body of powder or a casting, for example.

The stator core 21 includes an annular core back 211 and a plurality of teeth 212. An inner peripheral surface 213 of the annular core back 211 is fixed to the holding portion 30 of the base plate 40. Accordingly, the center of the stator core 21 overlaps the central axis Cx of the motor 100. Note that a fixing member may be interposed between the core back 211 and the holding portion 30.

The plurality of teeth 212 extend outward in the radial direction from the outer peripheral surface of the core back 211. The plurality of teeth 212 are arranged at regular intervals in the circumferential direction. The insulator (not illustrated) is made of, for example, an insulating material such as resin, and covers at least the teeth 212.

The insulator (not illustrated) electrically insulates the stator core 21 and the coil 22 from each other. The insulator (not illustrated) is not limited to resin, and a material that can insulate the stator core 21 and the coil 22 from each other can be widely adopted. In the case where the conductive wire and the teeth 212 are insulated from each other, the insulator (not illustrated) may be omitted.

The coil 22 is formed by winding a conductive wire around the teeth 212 via an insulator (not illustrated) covering the teeth 212. The conductive wire forming the coil 22 is connected to a circuit board (not illustrated). Then, three systems of current having different phases are supplied from the circuit board to the coil 22. When the current is supplied to the coil 22, the coil 22 is excited, and an attractive force or a repulsive force is generated between the coil 22 and the rotor magnet 13. By adjusting the supply timing of the current supplied to the coil 22, the rotor 10 rotates by the attractive force or the repulsive force.

The holding portion 30 protrudes upward along the central axis Cx from the upper surface of the base plate 40 disposed axially below the rotor 10 and the stator 20. The holding portion 30 and the base plate 40 are integrally formed. Note that the holding portion 30 may be formed separately from the base plate 40, and the holding portion 30 may be fixed to the base plate 40.

As illustrated in FIGS. 2 and 3, the holding portion 30 includes a first holding portion 31 and a second holding portion 32, and holds the bearing portion 50. That is, the holding portion 30 has a cylindrical shape centered on the central axis Cx and holds the bearing portion 50. The holding portion 30 has a through hole 300 vertically penetrating along the central axis Cx. The bearing portion 50 is disposed inside the through hole 300, and the bearing portion 50 rotatably supports the shaft 11. That is, the bearing portion 50 rotatably supports the shaft 11. The first holding portion 31 has a cylindrical shape centered on the central axis Cx. That is, the holding portion 30 has a cylindrical shape extending along the central axis Cx. The first holding portion 31 is connected to the base plate 40 at the lower end portion.

An outer peripheral surface 311 of the first holding portion 31 is provided with a core fixing portion 312, a small-diameter portion 313, and an outer holding surface 314. The stator core 21 is fixed to the first holding portion 31 in a state where the inner peripheral surface is in contact with the core fixing portion 312. Here, a method of fixing the first holding portion 31 to the core fixing portion 312 is press-fitting. However, a method of fixing the stator core 21 to the first holding portion 31 is not limited to press-fitting, and a fixing method capable of firmly fixing the stator core 21 to the first holding portion 31, such as adhesion, welding, deposition, and screwing, can be widely adopted. As illustrated in FIG. 3, an upper end portion 210 of the stator core 21 fixed to the first holding portion 31 is positioned above an upper end portion 320 of the second holding portion 32.

The small-diameter portion 313 is connected to the axially upper side of the core fixing portion 312. The small-diameter portion 313 has a tapered portion whose diameter decreases upward from the core fixing portion 312. The outer diameter of the small-diameter portion 313 is smaller than the outer diameter of the core fixing portion 312. That is, the first holding portion 31 has, in the upper portion of the outer peripheral surface 311, the small-diameter portion 313 having a smaller diameter than that of the portion in contact with the stator core 21 in the lower portion.

When the stator core 21 is attached to the holding portion 30, the upper portion of the holding portion 30, that is, the second holding portion 32 is inserted into the stator core 21. Thereafter, the small-diameter portion 313 of the first holding portion 31 is inserted into the stator core 21. The inner peripheral surface 213 of the stator core 21 is configured to be fixed in contact with the core fixing portion 312. Therefore, the inner diameter of the inner peripheral surface 213 of the stator core 21 is substantially equal to the outer diameter of the core fixing portion 312. The outer diameter of the small-diameter portion 313 and the outer diameter of the second holding portion 32 are smaller than the outer diameter of the core fixing portion 312. Therefore, the second holding portion 32 and the small-diameter portion 313 can be inserted into the stator core 21 without being in contact with the inner peripheral surface 213 of the stator core 21. Therefore, it is easy to insert the holding portion 30 into the stator core 21, and workability for manufacturing the motor can be enhanced.

The outer holding surface 314 has an annular shape expanding in a direction orthogonal to the central axis Cx on the radially outer side of the first holding portion 31. When the stator core 21 is attached to the holding portion 30 from above the holding portion 30, the lower end portion of the core back 211 comes into contact with the outer holding surface 314. Thus, the stator core 21 is axially positioned with respect to the holding portion 30.

The second holding portion 32 has a cylindrical shape centered on the central axis Cx. In the holding portion 30, the second holding portion 32 protrudes upward from an upper end portion 310 of first holding portion 31. That is, the second holding portion 32 has a cylindrical shape extending upward along the central axis Cx from the upper end portion 310 of the first holding portion 31.

The second holding portion 32 is formed integrally with first holding portion 31. However, the present disclosure is not limited to the case where the first holding portion 31 and the second holding portion 32 are integrally formed. After the second holding portion 32 is formed separately from the first holding portion 31, the second holding portion 32 may be fixed to the first holding portion 31 by a fixing method such as adhesion, welding, or press-fitting. The method for fixing the second holding portion 32 to the first holding portion 31 is not limited to the method described above, and a fixing method capable of firmly fixing the second holding portion 32 to the first holding portion 31 can be widely adopted.

The upper end portion 310 of the first holding portion 31 is an annular plane extending in a direction orthogonal to the central axis Cx. As a result, a step portion orthogonal to the central axis Cx is formed at the boundary between the first holding portion 31 and the second holding portion 32, and the small-diameter portion 313 is disposed below the step portion. The radial thickness W1 of the second holding portion 32 is thinner than the radial thickness of the first holding portion 31. The outer diameter of the second holding portion 32 is smaller than the outer diameter of the upper end portion 310 of the first holding portion 31, that is, the upper end of the small-diameter portion 313. Therefore, when the stator core 21 is disposed from the upper end portion of the holding portion 30, the second holding portion 32 is less likely to be an obstacle.

In the through hole 300 of the holding portion 30, holes having different inner diameters are axially connected. An intermediate portion in the axial direction is an intermediate hole 303, a lower portion than the intermediate hole 303 is a lower hole 304, and an upper portion is an upper hole 305. The through hole 300 has a first inner holding surface 301 expanding radially inward at a joint portion between the intermediate hole 303 and the lower hole 304. The through hole 300 also has a second inner holding surface 302 expanding radially inward at a joint portion between the intermediate hole 303 and the upper hole 305. In the holding portion 30, the second inner holding surface 302 is disposed below the upper end of the first holding portion 31. That is, the holding portion 30 has the inner holding surface 302 that expands radially inward from the inner peripheral surface axially below the upper end portion 310 of the first holding portion 31.

The bearing portion 50 includes a first bearing 51 and a second bearing 52. The first bearing 51 and the second bearing 52 are fixed to the inner peripheral surface of the through hole 300 of the holding portion 30, and rotatably support the shaft 11 with respect to the holding portion 30. The first bearing 51 supports an axially lower portion of the shaft 11, and the second bearing 52 supports an upper portion of the shaft 11 than the first bearing 51. That is, the bearing portion 50 includes the first bearing 51 and the second bearing 52 disposed above the first bearing 51. Since the first bearing 51 and the second bearing 52 rotatably support positions separated in the axial direction of the shaft 11, shaking during rotation of the shaft 11 is suppressed.

Here, detailed configurations of the first bearing 51 and the second bearing 52 will be described. In the bearing portion 50, the first bearing 51 and the second bearing 52 have the same configuration. Here, the first bearing 51 will be described as a representative of the first bearing 51 and the second bearing 52, and the configuration of the second bearing 52 will be described in correspondence with the configuration of the first bearing 51.

The first bearing 51 includes an inner ring 511, an outer ring 512, and balls 513. An inner ring 511 and an outer ring 512 have a tubular shape. In the first bearing 51, the inner ring 511 and the outer ring 512 are disposed to face each other in the radial direction centered on the central axis Cx. A plurality of balls 513 are interposed between the inner ring 511 and the outer ring 512 and arrayed along the circumferential direction. For example, the first bearing 51 is a ball bearing.

The inner ring 511 of the first bearing 51 is fixed to the outer peripheral surface of the shaft 11. The outer ring 512 of the first bearing 51 is fixed to the inner peripheral surface of the lower hole 304 of the through hole 300 of the holding portion 30. That is, the outer ring 512 of the first bearing 51 is fixed to the lower end portion of the inner peripheral surface of the first holding portion 31.

Thus, the outer ring 512 is positioned in the axial direction. The first bearing 51 is held at a position overlapping the first holding portion 31 in the radial direction.

The inner ring 511 and the outer ring 512 of the first bearing 51 are fixed to the lower hole 304 and the shaft 11 by press fitting, for example. However, the fixing of the inner ring 511 and the outer ring 512 of the first bearing 51 to the lower hole 304 and the shaft 11 is not limited to press-fitting, and examples thereof include deposition, adhesion, and welding. In addition to these, a fixing method in which the movement of the inner ring 511 and the outer ring 512 in the circumferential direction is restricted can be widely adopted.

The second bearing 52 includes an inner ring 521 corresponding to the inner ring 511 of the first bearing 51, an outer ring 522 corresponding to the outer ring 512, and balls 523 corresponding to the balls 513. The second bearing 52 is also attached to the holding portion 30 and rotatably supports the shaft 11.

The inner ring 521 of the second bearing 52 is fixed to the outer peripheral surface of the shaft 11. The outer ring 522 of the second bearing 52 is fixed to the inner peripheral surface of the upper hole 305 of the through hole 300 of the holding portion 30. That is, at least a part of the outer ring 522 of the second bearing 52 is fixed to the inner peripheral surface of the second holding portion 32.

At this time, the lower end portion of the outer ring 522 of the second bearing 52 comes into contact with the second inner holding surface 302. Thereby, the outer ring 522 is positioned in the axial direction. In the motor 100 of the present example embodiment, the outer ring 522 of the second bearing 52 is in direct contact with the second inner holding surface 302, but the present disclosure is not limited thereto. For example, the outer ring 522 may be in indirect contact with the second inner holding surface 302 via a member such as a washer. That is, the lower end portion of the outer ring 522 of the second bearing 52 directly or indirectly contacts the inner holding surface 302. As described above, the position of the second bearing 52 in the axial direction can be adjusted by interposing a member.

The inner ring 521 and the outer ring 522 of the second bearing 52 are fixed to the upper hole 305 and the shaft 11 by press fitting, for example. However, the fixing of the inner ring 521 and the outer ring 522 of the second bearing 52 to the shaft 11 and the upper hole 305 is not limited to press-fitting, and examples thereof include deposition, adhesion, and welding. In addition to these, a fixing method in which the movement of the inner ring 521 and the outer ring 522 in the circumferential direction is restricted can be widely adopted.

In the through hole 300, the second inner holding surface 302 is disposed below the upper end of the first holding portion 31. Therefore, the lower end portion of the second bearing 52 is held by the first holding portion 31, and the other portion is held by the second holding portion 32.

The first holding portion 31 is thicker in the radial direction than the second holding portion 32. Therefore, the first holding portion 31 has higher rigidity than the second holding portion 32. Since the lower end portion of the second bearing 52 is held by the first holding portion 31, the rigidity of attachment of the second bearing 52 can be increased. As a result, rattling, looseness, and the like of the second bearing 52 are suppressed, and stable operation of the second bearing 52 is possible for a long period of time.

As illustrated in FIGS. 3 and 4, the first bearing 51 holds the lower portion of the shaft 11. The second bearing 52 is disposed above the first bearing 51 on the shaft 11. More specifically, the second bearing 52 holds a portion above the portion held by the first bearing 51 of the shaft 11. Since the shaft 11 is held by the first bearing 51 and the second bearing 52, the center thereof overlaps the central axis Cx, and the shaft 11 is rotatable about the central axis Cx.

As illustrated in FIGS. 3 and 4, the lower end portion 125 of the rotor boss 124 is in contact with the inner ring 521 of the second bearing 52 below the upper end portion 210 of the stator core 21. Since a part of the rotor boss 124 is positioned below the upper end portion 210 of the stator core 21, the height of the motor 100 in the axial direction can be reduced. In addition, the lower end portion 125 of the rotor boss 124 presses the inner ring 521 of the second bearing 52, whereby the movement of the second bearing 52 in the axial direction is suppressed.

The motor 100 according to the present example embodiment has the above-described configuration.

Next, a relative position of each part of the motor 100 will be described. As illustrated in FIG. 4, in the motor 100, the stator core 21 is fixed to the core fixing portion 312 of the first holding portion 31 of the holding portion 30. That is, the stator core 21 is fixed to the outer peripheral surface 311 of the first holding portion 31.

As illustrated in FIGS. 3 and 4, the upper end portion 310 of the first holding portion 31 is positioned below the axial center line 20C of the stator core 21. The upper end portion 320 of the second holding portion 32 is positioned below the upper end portion 210 of the stator core 21.

With such a configuration, at least a part of a member such as the rotor boss 124 of the rotor case 12 can be positioned below the upper end portion 210 of the stator core 21. As a result, the axial height of the motor 100 can be reduced.

As illustrated in FIG. 4, an axial length L1 from the outer holding surface 314 to the upper end portion 310 of the first holding portion 31 is larger than an axial length L2 of the second holding portion 32.

With such a configuration, the stator core 21 can be firmly held by the first holding portion 31. In addition, the motor 100 can be reduced in weight by forming the second holding portion 32 short.

The radial thickness W1 of the second holding portion 32 is thinner than the radial thickness of the first holding portion 31. Therefore, when the stator core 21 of the core fixing portion 312 of the first holding portion 31 is fixed, a gap Th is formed between the second holding portion 32 and the inner peripheral surface 213 of the core back 211 of the stator core 21. That is, the second holding portion 32 is disposed with the gap Th interposed between it and the stator core 21 in the radial direction.

The radial thickness W1 of the second holding portion 32 is smaller than a radial distance W2 of the gap Th. That is, the second holding portion 32 is disposed with the gap Th interposed between it and the stator core 21 in the radial direction, and the radial thickness W1 of the second holding portion 32 is smaller than the radial distance W2 between the outer peripheral surface 321 of the second holding portion 32 and the inner peripheral surface 213 of the stator core 21.

As described above, in the motor 100, the rotor 10 rotates about the central axis Cx by supplying an electric current to the coil 22. A current is supplied to the coil 22. When a current is supplied to the coil 22, the coil 22 generates heat. The heat generated by the coil 22 is conducted to the entire motor 100 via the stator 20 and the holding portion 30 in contact with the stator 20.

In the motor 100, the stator core 21 is formed of a magnetic material, for example, a metal such as iron. Therefore, the heat generated by the coil 22 is conducted to the stator core 21. The gap Th is formed between the second holding portion 32 and the stator core 21.

Since the second holding portion 32 and the stator core 21 are not in direct contact with each other, and the radial distance W2 between the second holding portion 32 and the stator core 21 is larger than the radial thickness W1 of the second holding portion 32, heat is less likely to be directly transferred from the stator core 21 to the second holding portion 32. In addition, since there is the gap Th between the outer peripheral portion of the second holding portion 32 and the stator core 21, even if heat is transferred from the first holding portion 31 to the second holding portion 32, the transferred heat is released to the outside from the outer peripheral portion of the second holding portion 32. Therefore, conduction of the heat to the second bearing 52 is suppressed, and deterioration of the second bearing 52 (in particular, deterioration of the lubricant) due to a temperature rise can be suppressed, so that the second bearing 52 can be stably operated for a long period of time. Since the lower portion of the first bearing 51 faces the opening in the lower portion of the through hole 300, the temperature of the first bearing 51 is hardly raised. Therefore, deterioration due to a temperature rise is also suppressed in the first bearing 51, so that the first bearing 51 operates stably for a long period of time.

Figure 5:
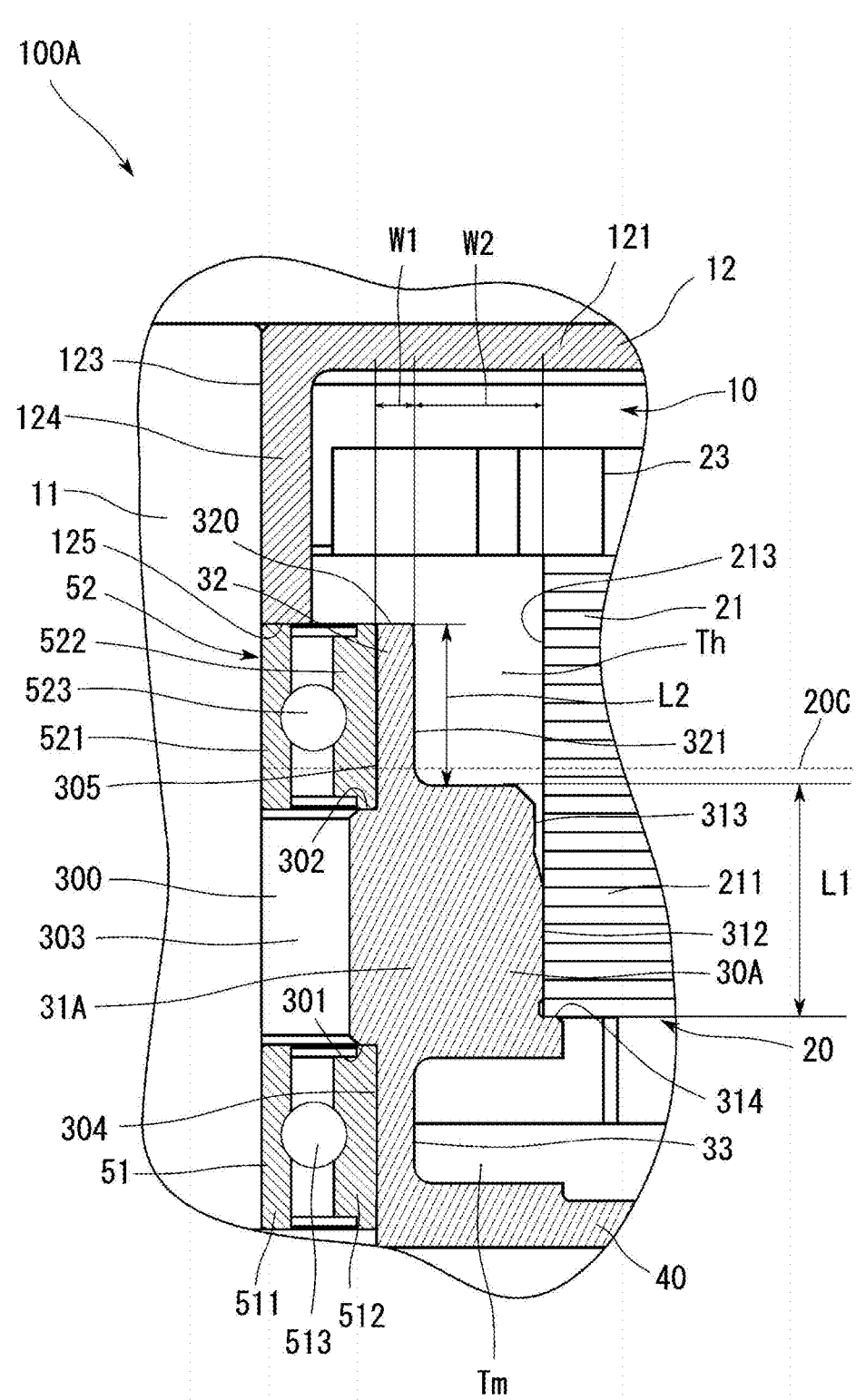
FIG. 5 is an enlarged cross-sectional view of a holding portion of a motor according to a modification of a preferred embodiment of the present application.

FIG. 5 is an enlarged sectional view of a holding portion 30A of a motor 100A according to a modification. As illustrated in FIG. 5, the holding portion 30A of the motor 100A is different from the holding portion 30 of the motor 100 in that the holding portion 30A has a recessed groove 33. The motor 100A has the same configuration as that of the motor 100 except for this point. Therefore, substantially the same parts as those of the motor 100 of the motor 100A are denoted by the same reference numerals, and the detailed description of the same parts is omitted.

As illustrated in FIG. 5, in the holding portion 30A, the first inner holding surface 301 is disposed axially below the outer holding surface 314. As a result, the first bearing 51 is disposed to be axially shifted from the stator core 21 in the axial direction. Therefore, the heat of the stator core 21 is less likely to be directly transferred to the first bearing 51.

As illustrated in FIG. 5, in the motor 100A, the recessed groove 33 recessed radially inward from the outer peripheral surface 311 is formed in the first holding portion 31A of the holding portion 30A. The recessed groove 33 is provided at a position overlapping the first bearing 51 in the radial direction. The recessed grooves 33 are connected in the circumferential direction. That is, the first holding portion 31A has the recessed groove 33 recessed radially inward on the outer peripheral surface 311 overlapping the first bearing 51 in the radial direction. The recessed groove 33 continues in the circumferential direction.

By forming the recessed groove 33, a gap Tm is formed radially outside a portion of the first holding portion 31 that holds the first bearing 51. As a result, since the heat of the first holding portion 31 is released to the outside from the gap Tm, the heat is less likely to be transmitted to the first bearing 51, and the temperature of the first bearing 51 is less likely to rise. Therefore, deterioration of the first bearing 51 (in particular, deterioration of the lubricant) due to a temperature rise is suppressed, and stable operation of the first bearing 51 is possible over a long period of time.

In the recessed groove 33, a plurality of grooves having a constant center angle centered on the center axis Cx may be disposed apart from each other in the circumferential direction. Even with such a configuration, heat conduction to the first bearing 51 can be suppressed, and deterioration due to a temperature rise of the first bearing 51 can be suppressed.

While the example embodiments of the present disclosure have been described above, the example embodiments can be modified in various ways within the scope of the present disclosure.

The present disclosure has the following configurations.

(1) A motor includes a rotor including a shaft and a rotor magnet that rotate about a central axis extending vertically, a stator including a stator core and facing a radially inner side of the rotor magnet, a bearing portion that rotatably supports the shaft, and a holding portion that is formed in a cylindrical shape centered on the central axis and holds the bearing portion. The bearing portion includes a first bearing and a second bearing disposed above the first bearing. The holding portion includes a cylindrical first holding portion extending along the central axis, and a cylindrical second holding portion extending upward along the central axis from an upper end portion of the first holding portion. The stator core is fixed to an outer peripheral surface of the first holding portion, and an outer ring of the first bearing is fixed to a lower end portion of an inner peripheral surface of the first holding portion. At least a part of an outer ring of the second bearing is fixed to an inner peripheral surface of the second holding portion. The second holding portion is disposed with a gap interposed between it and the stator core in the radial direction, and a radial thickness of the second holding portion is smaller than a radial distance between an outer peripheral surface of the second holding portion and an inner peripheral surface of the stator core.

(2) In the motor according to (1), the holding portion has an inner holding surface expanding radially inward from an inner peripheral surface below an upper end portion of the first holding portion. A lower end portion of the outer ring of the second bearing directly or indirectly contacts the inner holding surface.

(3) In the motor according to (1) or (2), an upper end portion of the first holding portion is positioned above the center of the stator core in the axial direction, and an upper end portion of the second holding portion is positioned below an upper end portion of the stator core.

(4) In the motor according to any of (1) to (3), the first holding portion has an outer holding surface that expands radially outward below an upper end portion of the first holding portion and is in contact with a lower end portion of the stator core. An axial length from the outer holding surface to the upper end portion of the first holding portion is larger than an axial length of the second holding portion.

(5) In the motor according to (4), the first holding portion includes a small-diameter portion in an upper portion of an outer peripheral surface, the small-diameter portion having a diameter smaller than a diameter of a portion in contact with the stator core in a lower portion.

(6) In the motor according to any of (1) to (5), the rotor includes a rotor hub fixed to the shaft. The rotor hub includes a through hole that is disposed at the center when viewed from the axial direction and in which the shaft is disposed, and a rotor boss that has a cylindrical shape extending axially downward from a peripheral portion of the through hole and to which the shaft is fixed. A lower end portion of the rotor boss is in contact with an inner ring of the second bearing below an upper end portion of the stator core.

(7) In the motor according to any of (1) to (6), the first holding portion includes a recessed groove recessed radially inward on an outer peripheral surface overlapping the first bearing in the radial direction. The recessed groove is continuous in the circumferential direction.

The motors according to example embodiments of the present disclosure can be used as, for example, a drive that rotates an impeller.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotor including a shaft and a rotor magnet rotatable about a central axis extending vertically;
a stator including a stator core, the stator being radially opposed to a radially inner side of the rotor magnet;
a bearing portion that rotatably supports the shaft; and
a holding portion having a cylindrical shape centered on the central axis, the holding portion holding the bearing portion; wherein
the bearing portion includes a first bearing and a second bearing located above the first bearing;
the holding portion includes:
a first holding portion having a cylindrical shape extending along the central axis; and
a second holding portion having a cylindrical shape extending upward along the central axis from an upper end portion of the first holding portion;
the stator core is fixed to an outer peripheral surface of the first holding portion, and an outer ring of the first bearing is fixed to a lower end portion of an inner peripheral surface of the first holding portion;
at least a portion of an outer ring of the second bearing is fixed to an inner peripheral surface of the second holding portion; and
a gap is located between the second holding portion and the stator core in a radial direction, and a radial thickness of the second holding portion is smaller than a radial distance between an outer peripheral surface of the second holding portion and an inner peripheral surface of the stator core;

the first holding portion includes an outer holding surface that extends radially outward below the upper end portion of the first holding portion and is in contact with a lower end portion of the stator core; and an axial length from the outer holding surface to the upper end portion of the first holding portion is larger than an axial length of the second holding portion.

2. The motor according to claim 1, wherein the holding portion includes an inner holding surface expanding radially inward from an inner peripheral surface that is below the upper end portion of the first holding portion; and a lower end portion of the outer ring of the second bearing is in direct or indirect contact with the inner holding surface.

3. The motor according to claim 1, wherein the upper end portion of the first holding portion is positioned below a center of the stator core in an axial direction; and an upper end portion of the second holding portion is positioned below an upper end portion of the stator core.

4. The motor according to claim 1, wherein the first holding portion includes a small diameter portion in an upper portion of the outer peripheral surface, the small diameter portion having a diameter that is smaller than a diameter of another portion of the first holding portion which is in contact with the stator core.

5. The motor according to claim 1, wherein the rotor includes a rotor hub fixed to the shaft; and the rotor hub includes:

a through hole that is located at a center when viewed from the axial direction, the shaft being located in the through hole; and a rotor boss having a cylindrical shape extending axially downward from a peripheral portion of the through hole, the rotor boss being fixed to the shaft; and a lower end portion of the rotor boss is in contact with an inner ring of the second bearing below an upper end portion of the stator core.

6. The motor according to claim 1, wherein the first holding portion includes a recessed groove recessed radially inward on an outer peripheral surface; and the recessed groove overlaps the first bearing in a radial direction and is continuous in a circumferential direction.

* * * * *